United States Patent [19]

Haug

[11] Patent Number: 4,509,768
[45] Date of Patent: Apr. 9, 1985

[54] VEHICLE WITH DETACHABLE IMPLEMENT

[75] Inventor: Walter Haug, Blaustein, Fed. Rep. of Germany

[73] Assignee: Karl Kassbohrer Fahrezeugwerke GmbH, Olm, Fed. Rep. of Germany

[21] Appl. No.: 446,014

[22] Filed: Dec. 1, 1982

[30] Foreign Application Priority Data

May 24, 1982 [DE] Fed. Rep. of Germany ... 8215040[U]

[51] Int. Cl.³ .......................... E02F 3/80; E02F 3/96
[52] U.S. Cl. ................................. 280/479 R; 172/272; 172/273; 280/477; 414/686; 414/723
[58] Field of Search .......... 280/479 R, 479 A, 478 R, 280/478 B, 477; 414/686, 723; 172/272, 273, 274, 275

[56] References Cited

U.S. PATENT DOCUMENTS

| | | | |
|---|---|---|---|
| 3,483,641 | 12/1969 | Hirt | 172/273 X |
| 3,512,665 | 5/1970 | Westendorf | 172/273 X |
| 3,760,883 | 9/1973 | Birk | 280/479 R X |
| 3,794,195 | 2/1974 | Clevenger et al. | 414/723 |
| 3,822,751 | 7/1974 | Waterman | 172/821 |
| 3,854,542 | 12/1974 | Jesswein et al. | 280/479 R X |

FOREIGN PATENT DOCUMENTS 0096200 12/1983 European Pat. Off. ............ 172/272

Primary Examiner—Joseph F. Peters, Jr.
Assistant Examiner—Mitchell J. Hill
Attorney, Agent, or Firm—Maurice E. Gauthier

[57] ABSTRACT

For use in detachably mounting an implement to a vehicle, the vehicle having associated therewith an adjustable take-up frame having at least one coupling element arranged to coact in engagement with a counter-coupling element on the implement, the improvement comprising: a mounting plate arranged on the implement in a substantially vertical plane extending transversely with respect to the working direction of the implement and the vehicle, the counter-coupling element being in the form of an open hook secured to and protruding rearwardly from the upper portion of said mounting plate, and the coupling element being in the form of a horizontal pin extending between two laterally spaced cheek plates, the said cheek plates forming part of the take-up frame, with said horizontal pin being arranged for engagement beneath said hook as the latter is received between said cheek plates.

5 Claims, 5 Drawing Figures

VEHICLE WITH DETACHABLE IMPLEMENT

BACKGROUND OF THE INVENTION

1. Field of the Invention

This invention relates in general to vehicles of the type which have implements detachably mounted thereon, and is concerned in particular with an improved coupling arrangement for such implements, wherein a take-up frame is adjustably carried on the vehicle, with coupling elements on the take-up frame arranged to coact in detachable engagement with counter-coupling elements on the implement.

2. Description of the Prior Art

An example of a vehicle of the abovementioned type is shown in U.S. Pat. No. 3,822,751 issued July 9, 1974. Here, the implement is a blade, and the coupling elements of the take-up frame and the blade comprise mutually alignable eyes adapted to receive linchpins. The problem with this type of arrangement, however, is that should a coupling operation be required to take place on uneven terrain, then it becomes difficult to achieve the necessary alignment of the eyes prior to insertion of the linchpins. This often results in considerable lost time. Moveover, personnel in addition to the vehicle operator are required to assist in the aforesaid alignment of the eyes as well as in the manual insertion or removal of the linchpins.

3. Summary of the Present Invention

The present invention has as its basic objective the provision of an improved coupling arrangement which enables both coupling and disengagement to take place without having to precisely align the take-up frame with the implement, thereby making it possible to efficiently effect coupling and detachment under all conditions, even where the terrain is uneven and the alignment between the vehicle and the implement is not exact.

A further objective of the present invention is the provision of a coupling arrangement which enables the vehicle operator to effect coupling and disengagement without assistance from additional personnel.

In the preferred embodiment of the invention to be described hereinafter in greater detail, these objectives are achieved by providing the vehicle with a take-up frame and the implement with a mounting plate arranged in a substantially vertical plane extending transversely with respect to the working direction of the implement and the vehicle. The upper portion of the mounting plate carries a counter-coupling element in the form of a rearwardly projecting open hook arranged to coact in mechanical engagement with a coupling element in the form of a horizontal pin extending between two cheek plates on the take-up frame. Adjusting devices are provided for vertically and angularly adjusting the take-up frame. During a coupling operation, the vehicle is moved towards the implement until the horizontal pin of the take-up frame contacts the mounting plate on the implement. Thereafter, the aforesaid adjusting devices are employed to elevate the take-up frame to mechanically engage the horizontal pin with the rearwardly projecting hook and to raise the implement slightly above ground level. The adjusting devices are then further employed to rearwardly incline the take-up frame, thereby causing the implement to swing against the take-up frame, thus completing the coupling operation.

The mechanical engagement of the horizontal pin with the rearwardly protruding hook can be accomplished remotely by the vehicle operator while he remains seated in the vehicle cab, without assistance from other personnel, and even under conditions where the terrain is uneven and the vehicle and implement are not precisely aligned one with the other. The two cheek plates on the mounting frame receive the rearwardly protruding hook therebetween and thereby insure appropriate centering of the implement with respect to the take-up frame and the vehicle.

Preferably, the aforesaid hook opens downwardly and the horizontal pin is elevated during the coupling operation. This enables the upper portion of the mounting plate and the hook protruding rearwardly therefrom to remain visible to the vehicle operator during the initial stages of the coupling operation, thus serving as reference points to assist in guidance.

Preferably, the rearwardly protruding hook is in the form of a triangle, the base of which is connected to the mounting plate and the apex of which points downwardly. This arrangement facilitates insertion of the hook between the cheek plates of the mounting frame.

Preferably, the length of the base of the aforesaid triangle is just slightly less than the spacing between the cheek plates. With this arrangement, once the hook is inserted over the horizontal pin and is located between the cheek plates, lateral movement of the implement in relation to the take-up frame will be prevented by virtue of the fact that the base of the hook will be laterally confined between the cheek plates.

Advantageously, the mounting plate is in the form of an isosceles triangle, the upper portion of which supports the rearwardly protruding hook. The triangular shape of the mounting plate assists the vehicle operator during initial alignment of the vehicle with the implement, and thereby further facilitates the coupling operation.

Preferably, the rearwardly protruding hook has an L-shaped cross section with one leg protruding horizontally from the upper portion of the mounting plate, and with the other leg extending downwardly and being inclined slightly away from the mounting plate.

An important advantage of the present invention lies in the fact that coupling can be effected even though the implement has an uneven load distribution. In practice, it seldom happens that the implement is evenly balanced. This can be due in part to the fact that the implements have asymmetrically arranged drives, or for other reasons such as for example unequal loading of dirt, snow, etc. during actual working. Such uneven load distributions do not adversely affect the coupling operation of the present invention, however, since there is a self-leveling effect which takes place once the hook has been engaged over the horizontal pin and the take-up frame has been raised to elevate the implement above ground level.

These and other objects and advantages of the present invention will become more apparent as the description proceeds with the aid of the accompanying drawings wherein:

DETAILED DESCRIPTION OF PREFERRED EMBODIMENT

Figure 1:
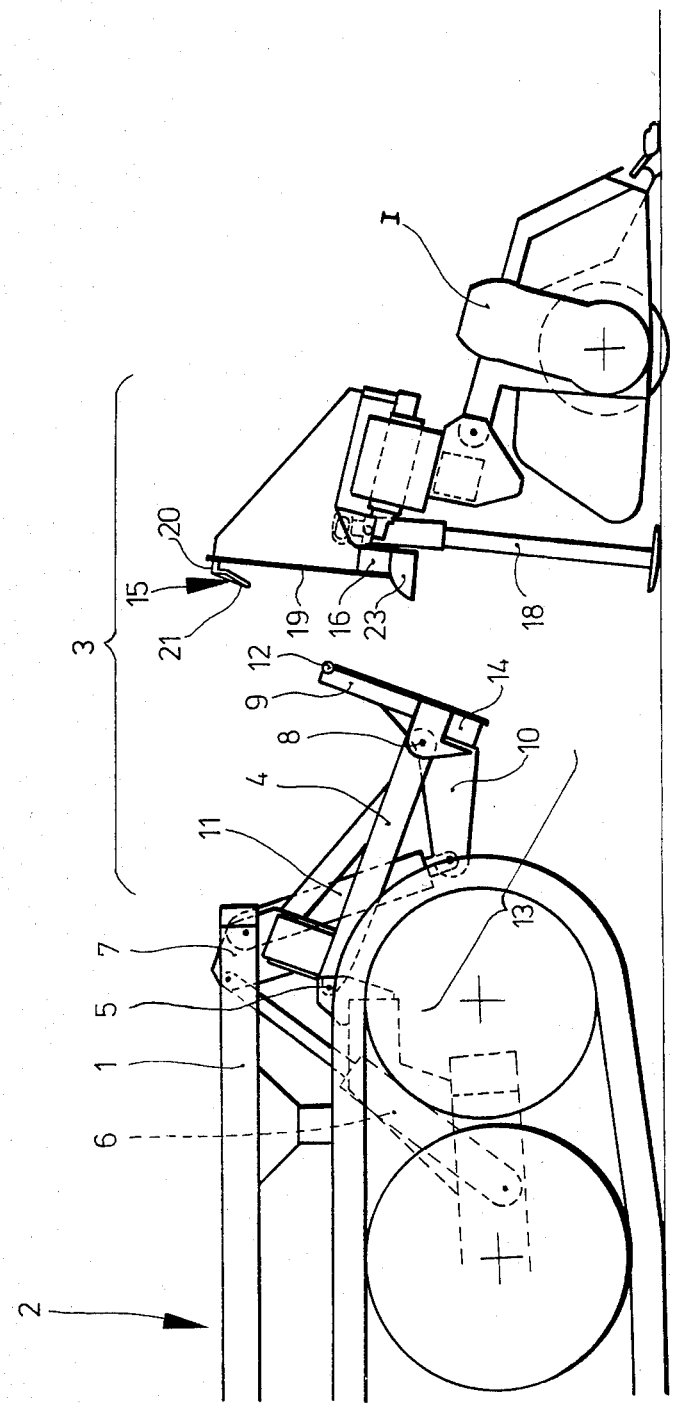
FIG. 1 is a side elevational view showing a vehicle and an implement in the form of a snowblower, each including components of a preferred embodiment of a coupling arrangement in accordance with the present invention, with the take-up frame on the vehicle being separated from the implement.

Referring initially to FIG. 1, reference numeral 1 indicates the rear portion of a vehicle 2. Reference numeral 3 refers generally to an assembly for detachably connecting an implement "I" to the rear portion of the vehicle. The assembly 3 includes a carrier 4 which is mounted to the vehicle for pivotal movement about a horizontal axis 5. Pivotal movement is imparted to the carrier by an adjusting device 6 in the form of a piston-cylinder unit which is pivotally connected at its opposite ends to the vehicle and to an arm 7 rigidly connected to the carrier 4. A horizontal axle 8 is carried at the forward end of the carrier 4. A pair of laterally spaced cheek plates 9 are supported on the carrier for pivotal motion on the axle 8. This pivotal motion is imparted by means of an arm 10 which is fixed relative to the cheek plates and which extends rearwardly therefrom for connection to a second adjusting device 11, again in the form of a piston-cylinder unit.

Figure 5:
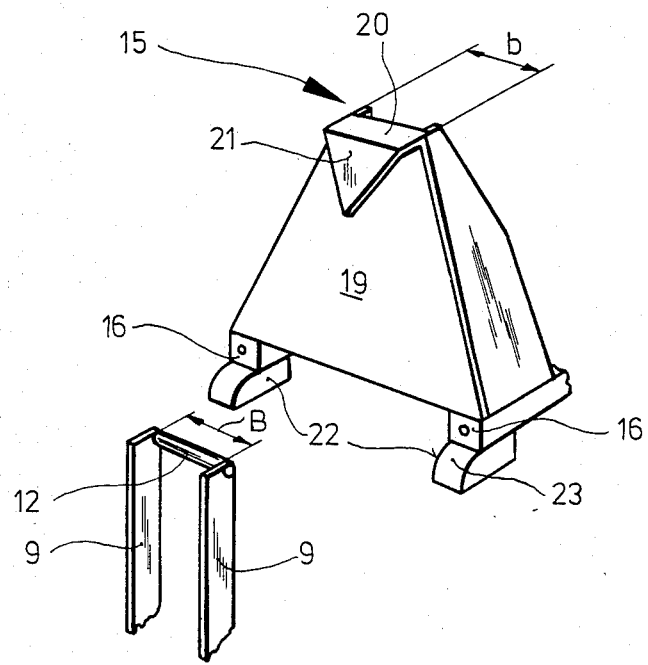
FIG. 5 is an exploded perspective view of selected components of the coupling arrangement.

As can be best seen in FIG. 5, the two cheek plates 9 are parallel and interconnected at their upper ends by means of a horizontal pin 12.

The carrier 4, the arms 7 and 10 and the cheek plates 9 form a take-up frame 13 which can be vertically and angularly adjusted by the vehicle operator through appropriate operation of the adjusting devices 6, 11. Although not shown, it will be understood that the adjusting devices 6 and 11 are remotely operable by the vehicle operator while he remains seated in the vehicle cab. The pin 12 functions as a coupling element along with a pair of additional coupling elements 14 located on the lowermost outboard sides of the cheek plates 9. As will hereinafter be explained, these coupling elements are arranged to coact in mechanical engagement with counter-coupling elements 15, 16 associated with the implement I.

At the stage shown in FIG. 1, the implement I is supported on the ground by means of auxiliary legs 18. The implement is additionally provided with a substantially vertical mounting plate 19 arranged in a plane extending transversely with respect to the longitudinal axes and the working directions of the implement and the vehicle. The mounting plate 19 is generally in the form of an isosceles triangle with two equal sides converging upwardly towards a truncated apex at which is located the counter-coupling element 15. Counter-coupling element 15 is in the form of a hook having an L-shaped cross section with one leg 20 protruding rearwardly from the mounting plate 19, and with the other leg 21 extending downwardly from leg 20 and being inclined slightly away from the mounting plate. The leg 21 is also in the shape of a triangle having its base joined to leg 20 and having its apex pointing downwardly. The width of the base of the triangular leg 21 and the width of the leg 20 are slightly smaller than the distance "B" between the two cheek plates 9.

The coupling elements 14 and the counter-coupling elements 16 can comprise any one of a number of well-known automatically operable assemblies. These can include matching cam recesses, power screws, rapid-action couplings, etc. Such devices will of course also be remotely operable by the vehicle operator from the vehicle cab.

To further facilitate the coupling operation, the counter-coupling elements 16 are provided with rearwardly protruding feet having crowned cam surfaces 23 arranged to coact with the bottom edges of the coupling elements 14.

Figure 2:
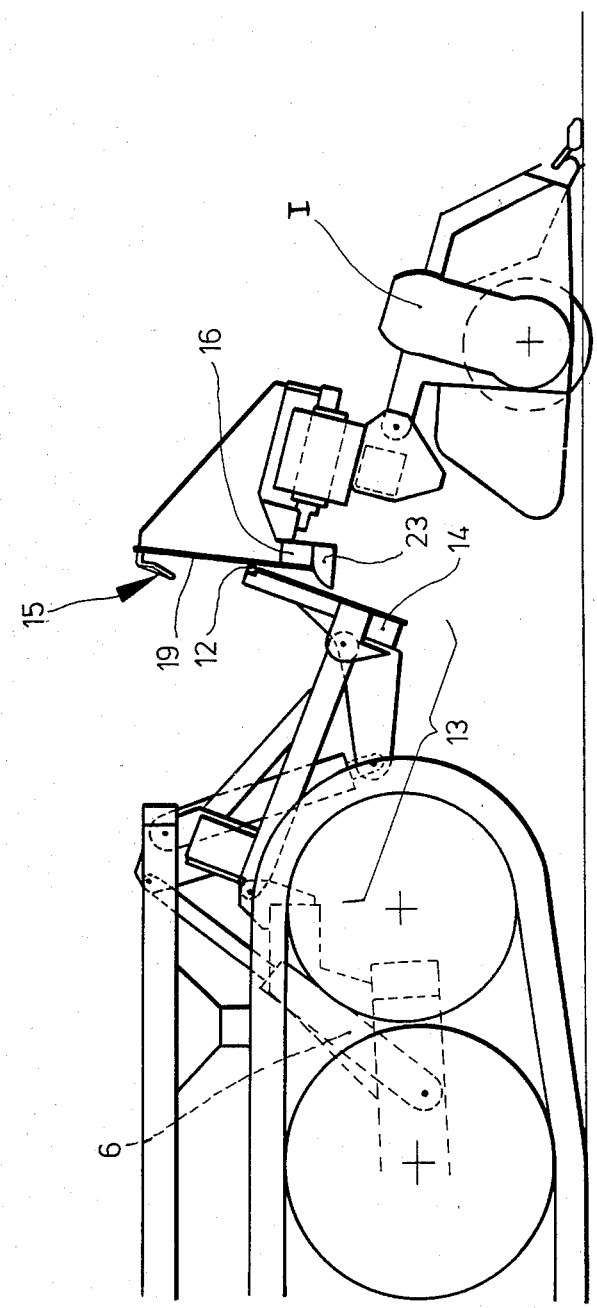
FIG. 2 is a view similar to FIG. 1 showing the vehicle moved closer to the implement to place the horizontal pin in contact with the mounting frame.
Figure 3:
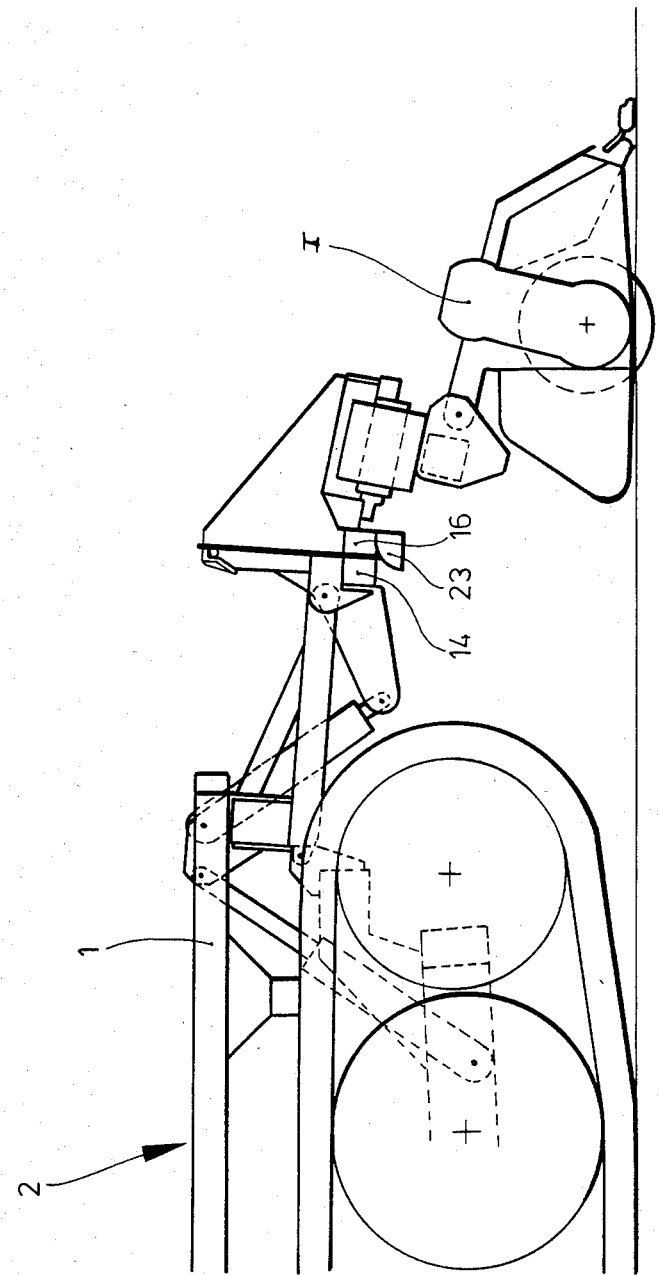
FIG. 3 is another view similar to FIGS. 1 and 2 showing the components in a more advanced stage of the coupling operation.
Figure 4:
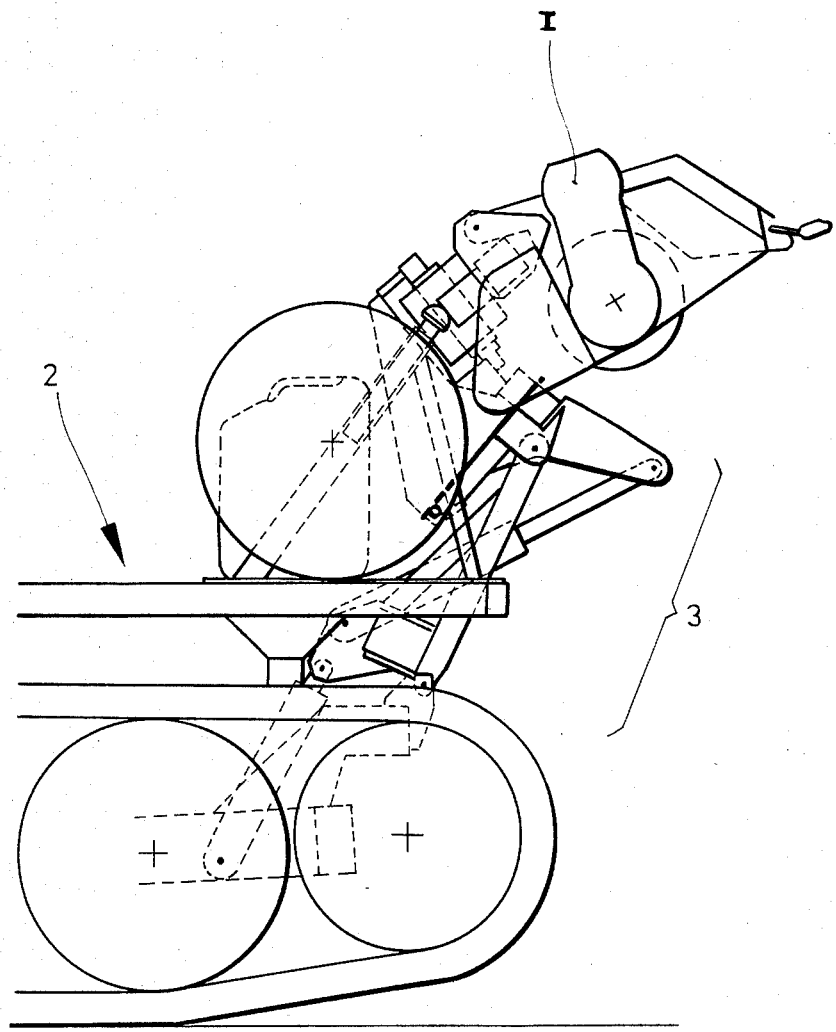
FIG. 4 is another side view showing the implement fully coupled to the vehicle.

A coupling operation will now be described with further reference to FIGS. 2-4. As shown in FIG. 2, the vehicle 2 is initially moved towards the implement I until the horizontal pin 12 comes into contact with the mounting plate 19. At this point in time, the weight of the implement is removed from the auxiliary legs 18, allowing them to fall away. Thereafter, the adjusting device 6 is employed to pivotally elevate the take-up frame until the horizontal pin 12 is securely engaged beneath the hook-shaped counter-coupling element 15. During this upward pivotal movement, the cheek plates 9 gradually straddle the triangular leg 21 thereby providing a self-aligning effect. At the end of the upward pivotal movement of the take-up frame, the base of the triangular leg 21 is laterally confined between the cheek plates 9, thereby insuring that the implement I is approximately centered with respect to the axis of the vehicle.

Once the horizontal pin 12 has been securely engaged beneath the hook-shaped counter-coupling element 15, the take-up frame 13 is additionally elevated by further operation of the adjusting device 6, and the adjusting device 11 is employed to incline the take-up frame in a counter-clockwise direction as viewed in the drawings. This causes the mounting plate 19 to swing towards the take-up frame 13, thus bringing the coupling elements 14 into contact with the counter-coupling element 16. During this movement, the crowned cam surfaces 23 coact with the lower edges of the coupling elements 14 to assist in achieving appropriate alignment. The coupling elements 14 are then engaged with the counter-coupling elements 15, after which the implement may be further elevated to the position shown in FIG. 4.

In light of the foregoing, it will now be appreciated that the present invention offers a number of significant advantages over known prior art coupling arrangements. Among these advantages is the fact that due to the self-aligning characteristics of the coacting coupling and counter-coupling elements, a coupling operation can be carried out by the vehicle operator while he remains seated in the vehicle cab, without assistance from auxiliary personnel. This can take place even though the terrain is uneven and the implement is not initially aligned with the vehicle.

Although the invention has been described in connection with the coupling of an implement to the rear portion of a vehicle, it will be understood by those skilled in the art that the invention would be equally applicable to the attachment of implements to the forward end of a vehicle. Moreover, the position of the component parts could be reversed so that those components shown on the vehicle could be interchanged for those on the implement and vice versa.

It is my intention to cover these and any other modifications which do not depart from the spirit and scope of the invention as defined by the appended claims.

I claim:

1. For use in detachably mounting an implement to a vehicle, the vehicle having associated therewith an adjustable take-up frame having at least one coupling element arranged to coact in engagement with a counter-coupling element on the implement, the improvement comprising: a mounting plate arranged on the implement in a substantially vertical plane extending transversely with respect to the working direction of the implement and the vehicle, the counter-coupling element being in the form of a single downwardly opening hook centrally secured to and protruding rearwardly from the upper portion of said mounting plate, said hook being substantially triangular in shape and having its apex directed downwardly, and the coupling element being in the form of a horizontal pin extending between two laterally spaced cheek plates, said cheek plates forming part of the take-up frame, with the spacing between said cheek plates being only slightly greater than the largest width dimension of said hook, and with said horizontal pin being arranged for engagement beneath said hook as the latter is received between said cheek plates.

2. The improvement according to claim 1 wherein said mounting plate is in the shape of an isosceles triangle, and said hook is located in the uppermost region of said triangle.

3. The improvement according to claim 1 wherein said hook has an L-shaped cross-section, with one leg thereof protruding rearwardly from said mounting plate, and with the other leg thereof being inclined away from said mounting plate.

4. The improvement according to claim 1 further comprising additional coupling and counter-coupling elements located respectively on said take-up frame and said mounting plate, the said additional counter-coupling elements having cam surfaces associated therewith which are arranged to coact with surfaces of said additional coupling elements to assist in aligning said implement with said take-up frame.

5. For use in detachably mounting an implement to a vehicle, the vehicle having associated therewith an adjustable take-up frame having at least one coupling element arranged to coact in engagement with a counter-coupling element on the implement, the improvement comprising: a mounting plate arranged on the implement in a substantially vertical plane extending transversely with respect to the working direction of the implement and the vehicle, said mounting plate having a top portion which is narrower in width than its bottom portion, the counter-coupling element consisting of a single substantially triangular open hook, the base of said hook being connected to the top portion of said mounting plate with the apex of said hook pointing downwardly, and the coupling element being in the form of a horizontal pin extending between two laterally spaced cheek plates, said cheek plates forming part of the take-up frame, with the spacing between said cheek plates being only slightly greater than the width of the base of said hook, and with said horizontal pin being arranged for engagement beneath said hook as the latter is received between said cheek plates.

* * * * *